United States Patent [19]

Branscome

[11] 4,091,423
[45] May 23, 1978

[54] SYNCHRONOUS DIGITAL DATA SCRAMBLING SYSTEM

[75] Inventor: Kenneth M. Branscome, Dallas, Tex.

[73] Assignee: Datotek, Inc., Dallas, Tex.

[21] Appl. No.: 559,389

[22] Filed: Mar. 17, 1975

[51] Int. Cl.² .......................... H04N 1/44; H04L 7/00
[52] U.S. Cl. ...................................... 358/259; 178/22; 178/69.1; 358/260
[58] Field of Search ...................... 178/5.1, 22, 69.5 F, 178/69.1; 325/122, 32; 235/181; 358/256, 259, 261, 262, 263, 141, 260

[56] References Cited

U.S. PATENT DOCUMENTS

| 3,541,257 | 11/1970 | McCormick et al. | 178/22 |
| 3,659,046 | 4/1972 | Angeleri et al. | 178/22 |
| 3,723,878 | 3/1973 | Miller | 325/32 |
| 3,746,799 | 7/1973 | Gentges | 178/22 |
| 3,760,355 | 9/1973 | Bruckert | 340/146.2 |
| 3,781,472 | 12/1973 | Goode et al. | 178/22 |
| 3,798,650 | 3/1974 | McComas et al. | 343/225 |
| 3,876,832 | 4/1975 | Morgan et al. | 178/22 |
| 3,893,031 | 7/1975 | Majeau et al. | 179/1.5 R |

Primary Examiner—S. C. Buczinski
Attorney, Agent, or Firm—Richards, Harris & Medlock

[57] ABSTRACT

The specification discloses a system for scrambling digital signals transmitted between a synchronous data transmitting station and a receiving station. When the scrambling system is used with a facsimile system, a first scrambler is connected between the video amplifier and the transmitter modulator of the transmitting facsimile station. The first scrambler includes digital circuitry for digitizing the output of the video amplifier and enciphering circuitry for enciphering the digitized output of the video amplifier and for transmitting the enciphered output to the receiving facsimile station. A second scrambler is connected between the demodulator and the write amplifier of the receiving facsimile station. The second scrambler includes deciphering circuitry for deciphering the output of the demodulator and for applying the deciphered output to the write amplifier to provide a duplicate of the transmitted facsimile material. Initialization between the first and second scrambler is accomplished with the use of correlation and prime patterns. Circuitry is provided to maintain the first and second scramblers in synchronization with one another, and alarm systems are provided to indicate malfunction of the scramblers and to prevent the transmission of sensitive data in the unciphered state.

16 Claims, 29 Drawing Figures

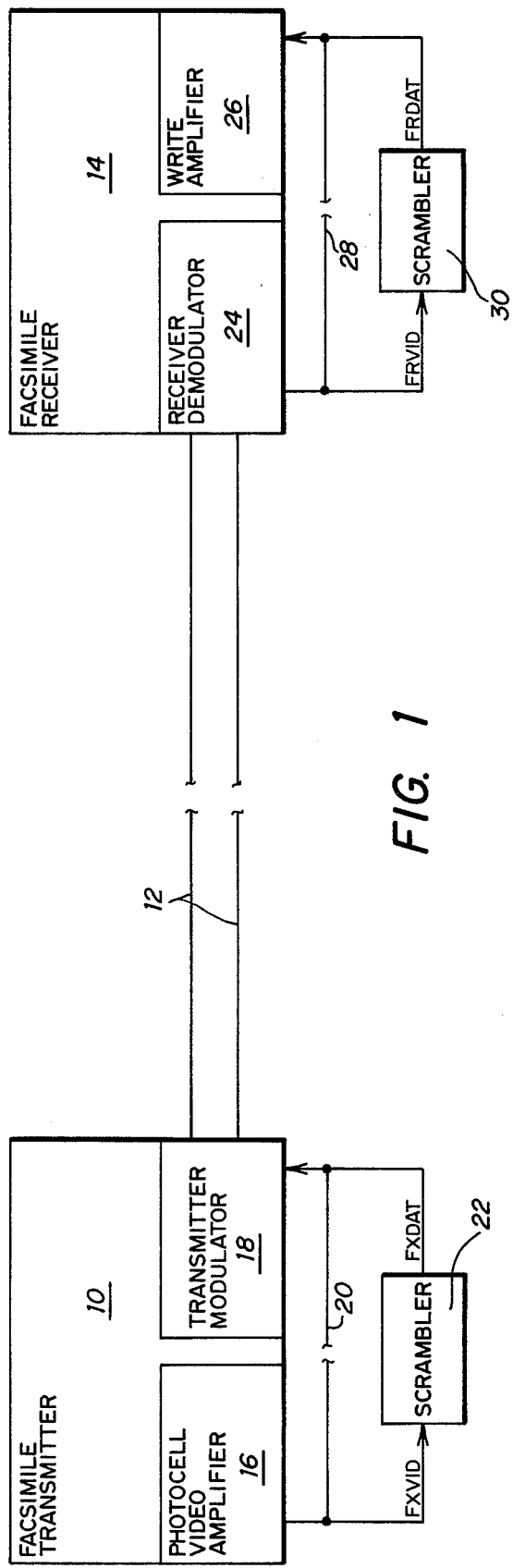
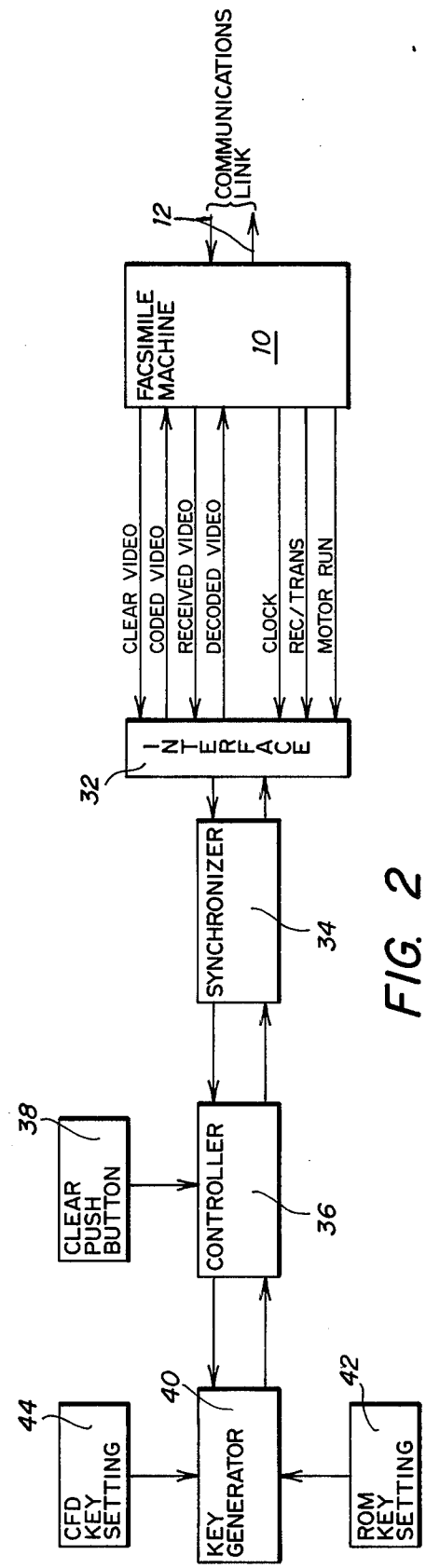
FIG. 1
FIG. 2

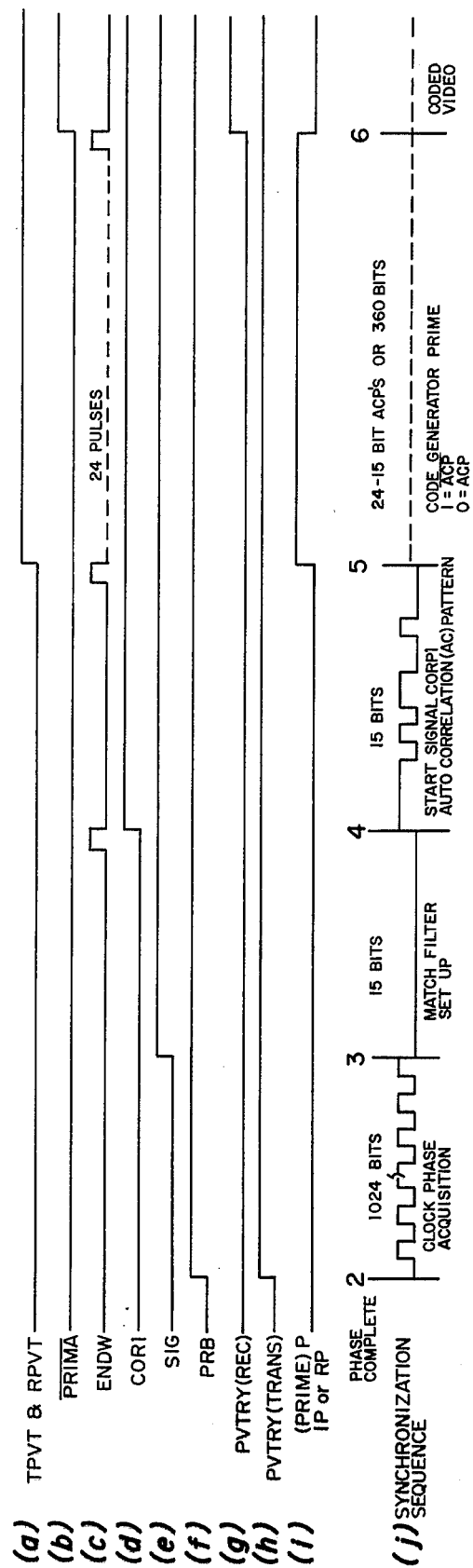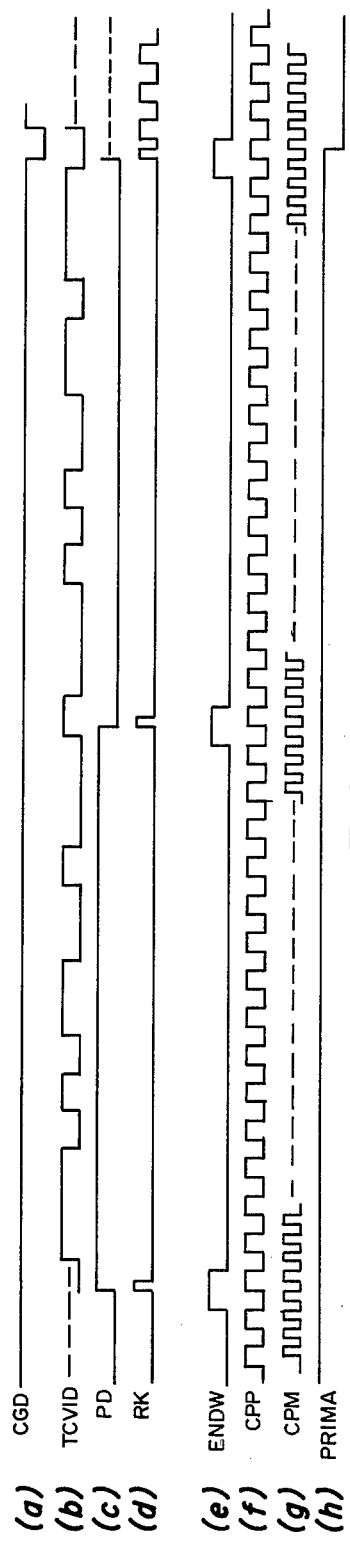
FIG. 4
FIG. 5

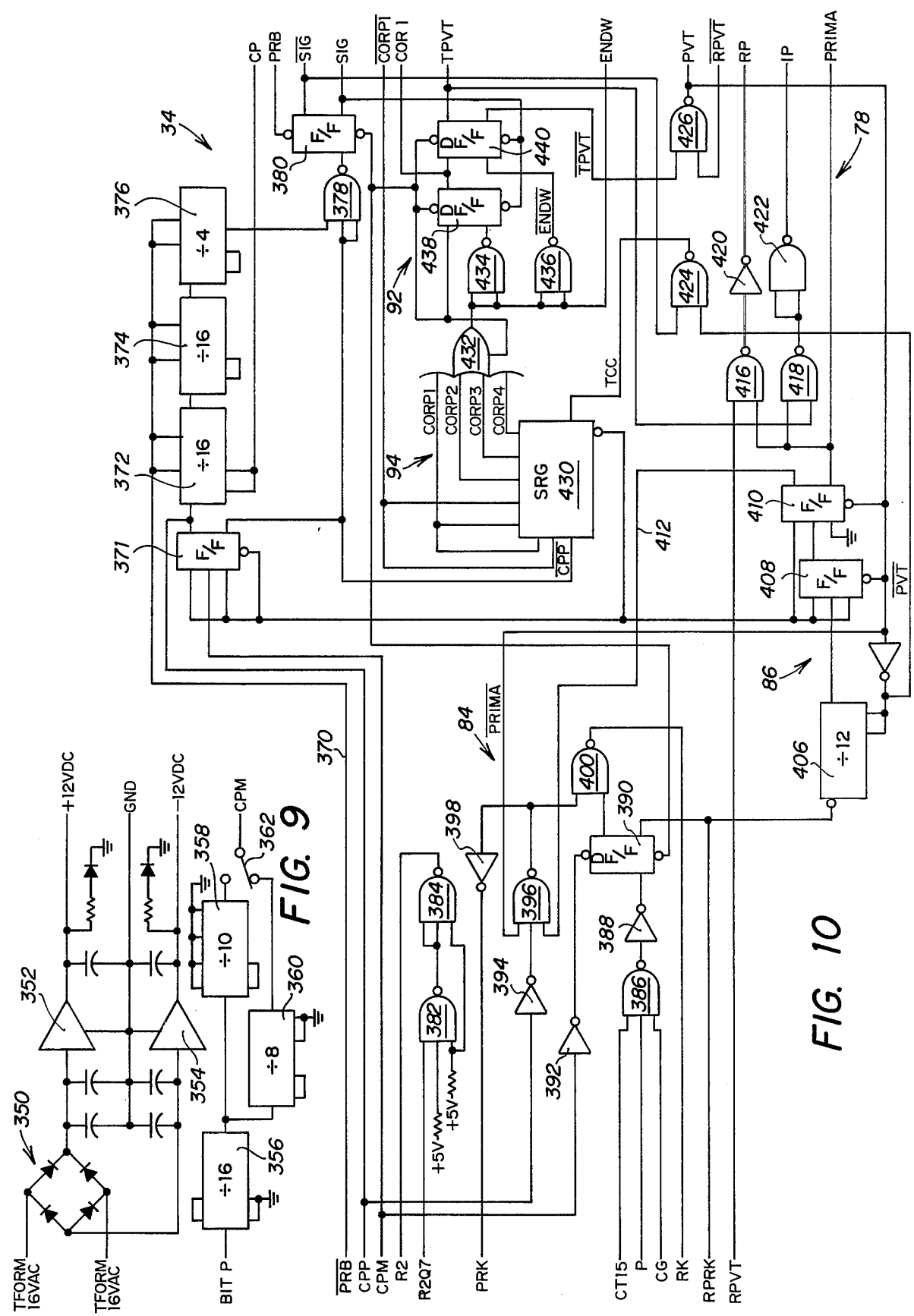

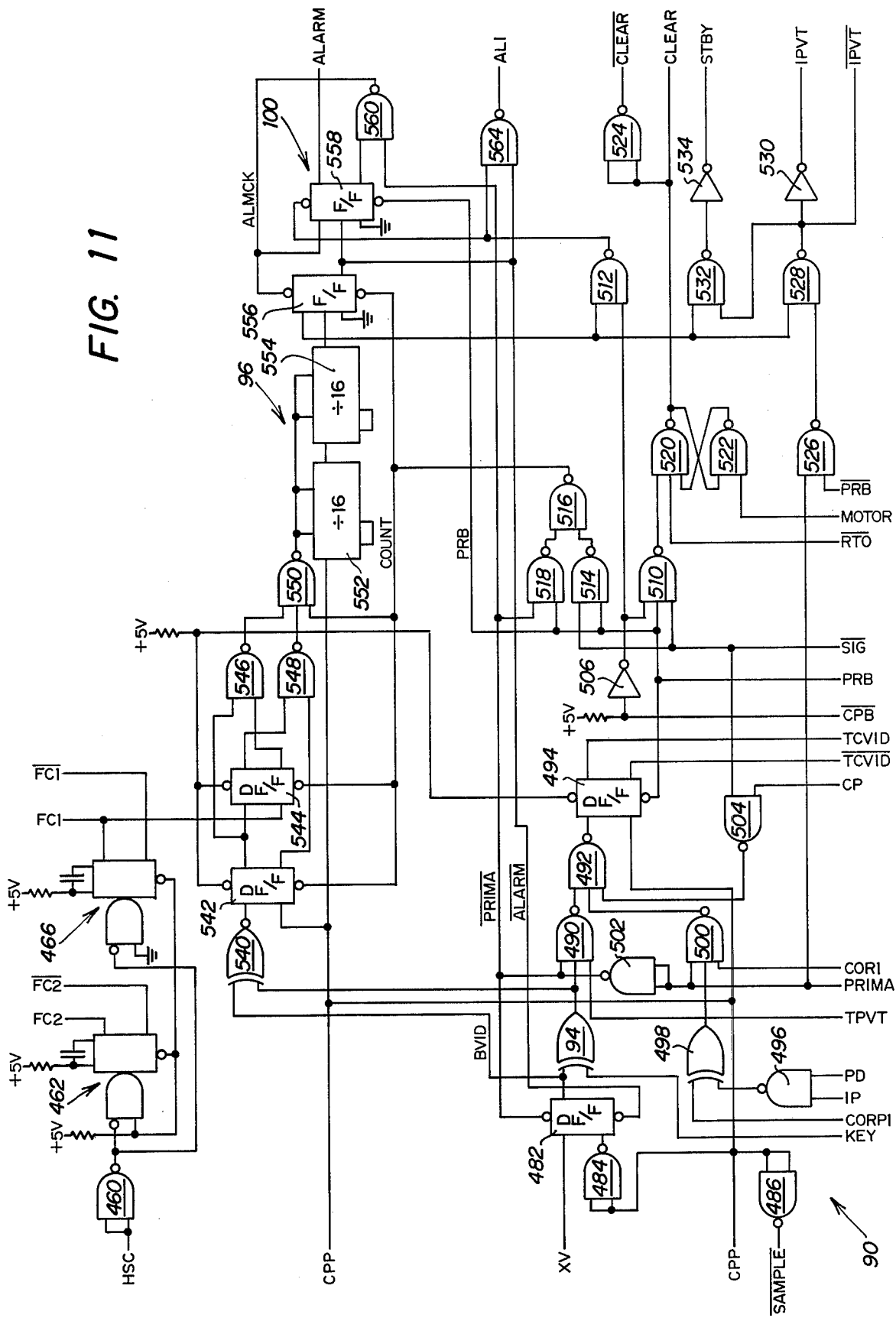

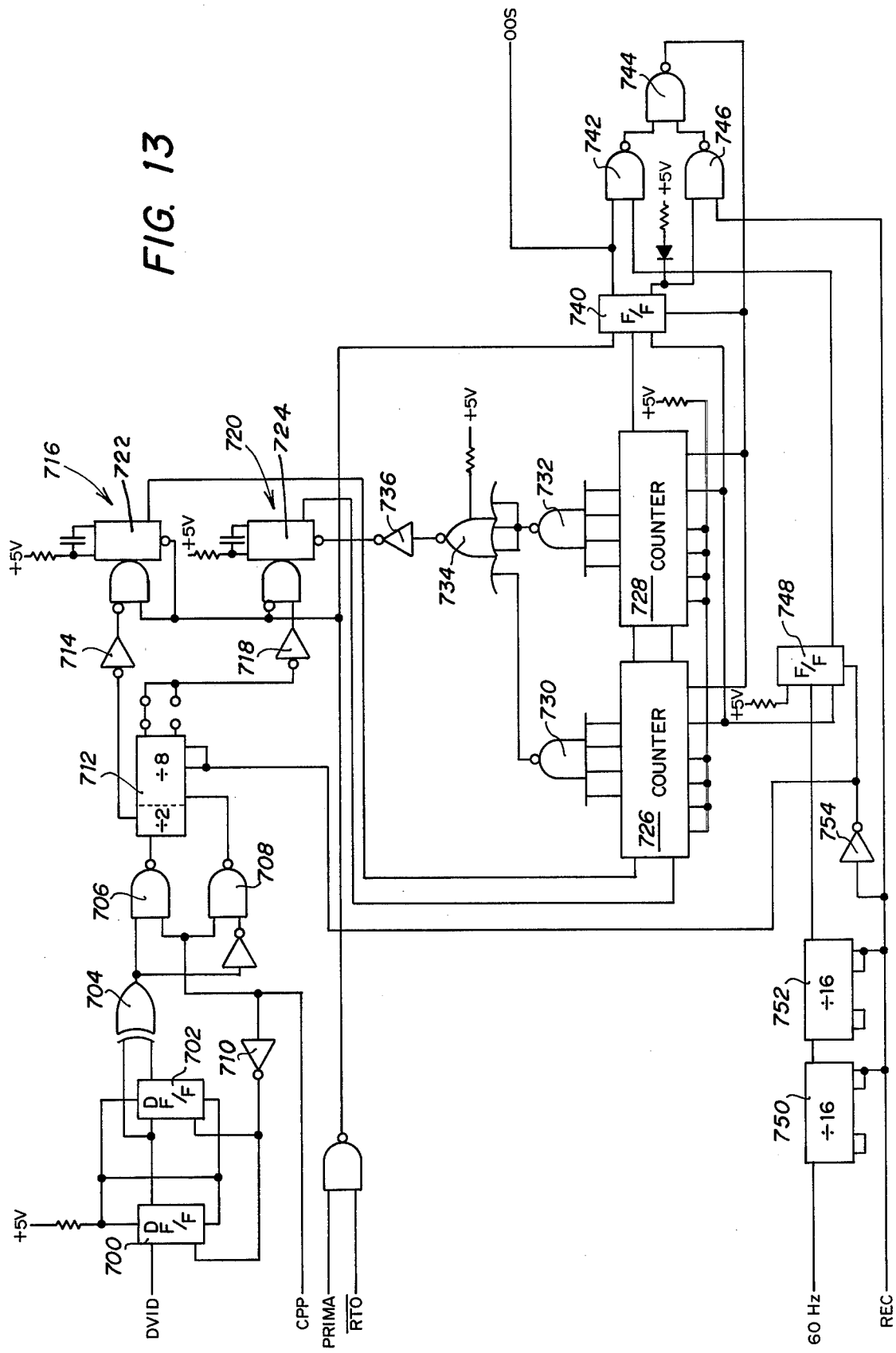

SYNCHRONOUS DIGITAL DATA SCRAMBLING SYSTEM

FIELD OF THE INVENTION

This invention relates to digital enciphering, and more particularly relates to a system for enciphering or scrambling facsimile signals.

THE PRIOR ART

Synchronous data systems are commonly utilized in order to transmit digital data to a remote location by means of electrical signals. For example, many industries transmit documents from one location to another by use of facsimile machines which convert the written information on the documents into digital electrical signals and transmit the signals over telephone lines and the like. Further, synchronous data systems are used to transmit digital computer data via transmission networks to high speed printers and the like. In many industries, as for example the petroleum and banking industries, it is important that various types of data, logs, reports and other documents are able to be transmitted over such systems with a high degree of security. This need for security if further increased due to the development of electronic techniques to enable unauthorized monitoring or tapping of transmission lines in order to gather secret information for competitors or for other parties.

A need has thus arisen for the use of enciphering or scrambling devices which may be attached to a synchronous data communications link in order to render the transmitted information unintelligible to an unauthorized party who attempts to tap or intercept the transmitted data. While such enciphering or scrambling devices have long been utilized for teleprinter and voice communications, high security enciphering or scrambling devices have not been heretofore developed which are completely satisfactory for use with conventional synchronous data communications systems, because of the complex technical problems which must be solved. For example, a practical facsimile scrambling system must operate with facsimile equipment without synchronous digital outputs, thereby substantially increasing the complexity of the enciphering technique. Moreover, the majority of facsimile machines today provide only an analog (gray scale) output, while sophisticated scrambling techniques require the facsimile data to be digitized and clocked. Moreover, a practical facsimile scrambling device must have means for interconnecting with standard facsimile machines which is both simple and direct in order to keep the interface cost low, while maintaining good received image quality.

SUMMARY OF THE INVENTION

In accordance with the present invention, an enciphering system is provided which may be easily and simply interconnected with conventional synchronous data transmission systems without disrupting the operation of the systems, and yet which provides a high degree of security of transmission of the signals.

In accordance with a specific aspect of the present invention, a system is provided for scrambling facsimile signals transmitted between a transmitting facsimile station and a receiving facsimile station. A first scrambler is connected between the video amplifier and the transmitter modulator of the transmitting facsimile station. The first scrambler includes digitizing circuitry for digitizing the output of the video amplifier. The first scrambler also includes enciphering circuitry for enciphering the digitized output of the video amplifier and for transmitting the enciphered output through the transmitter to the receiving facsimile station. A second scrambler is connected between the demodulator and the write amplifier of the receiving facsimile station. The second scrambler includes deciphering circuitry for deciphering the output of the demodulator and for applying the deciphered output to the write amplifier to provide a duplicate of the transmitted facsimile material.

In accordance with another aspect of the invention, a scrambler system for a facsimile transmission includes a synchronizer at a first location for generating a predetermined digital correlation pattern followed by a predetermined digital prime sequence. Circuitry digitizes and enciphers facsimile data and transmits the enciphered data to a second location. A correlation detection circuit at the second location detects the correlation pattern and the prime sequence. A receiver is responsive to the correlation detector for receiving and deciphering the enciphered data.

In accordance with another aspect of the invention, a system for scrambling facsimile data includes circuitry for generating a randomized digital keystream. Circuitry receives the facsimile data and enciphers the facsimile data in response to the randomized keystream. Circuitry compares the facsimile data with the enciphered data and generates an alarm signal if the facsimile and enciphered data are alike or the inverse of one another for a predetermined period. Circuitry forces the generation of the first alarm signal during initial operation of the system. Circuitry generates a second alarm signal if the first alarm signal is not generated during a prescribed time in initial operation of the system.

In accordance with yet another aspect of the invention, an out of synchronization detector is provided for use with a scrambler for a facsimile transmission system. Circuitry at a first facsimile station enciphers clear facsimile data and transmits enciphered digital data to a second facsimile station. Circuitry at the second facsimile station deciphers the enciphered digital data to provide received digital clear facsimile data. Circuitry counts up when adjacent bits of the received digital clear facsimile data are alike and counts down when adjacent bits of the received digital clear facsimile data are not alike. Circuitry generates an out of synchronization signal when the counting circuitry counts to a predetermined level.

In accordance with yet another aspect of the invention, a scrambler for use with a facsimile transmission system includes circuitry at a first location for enciphering clear facsimile data and for transmitting scrambled digital facsimile data to a second location. The circuitry operates in accordance with a first predetermined internal clock signal. Circuitry at the second location deciphers the scrambled digital data in accordance with a second internal clock signal. Phase lock loop circuitry is responsive to the scrambled digital facsimile data and the second internal clock signal for generating addition and subtraction signals. Circuitry is responsive to the addition and subtraction signals for varying the second internal clock signal to maintain the first and second clock signals in synchronization.

DESCRIPTION OF THE DRAWINGS

For a more complete understanding of the present invention and for further objects and advantages thereof, reference is made to the following description taken in conjunction with the accompanying Drawings, in which:

FIG. 1 is a block diagram of the transmitting and receiving facsimile system with the present scrambler system attached thereto;

FIG. 2 is a block diagram of one of the scrambler systems shown in FIG. 1;

FIGS. 4a–4j are waveforms of the initialization procedure of the present scrambler device;

FIGS. 5a–5h comprise waveforms generated by the present system during the prime data transfer stage of operation;

FIG. 9 is a schematic diagram of the power supply and clock division circuitry of the invention;

FIG. 10 is a schematic diagram of the synchronizer circuitry of the invention;

FIG. 11 is a schematic diagram of the transmit logic and associated circuitry of the invention;

FIG. 13 is a schematic diagram of the out-of-sync detector circuitry of the present invention.

DESCRIPTION OF THE PREFERRED EMBODIMENT

Figure 3:
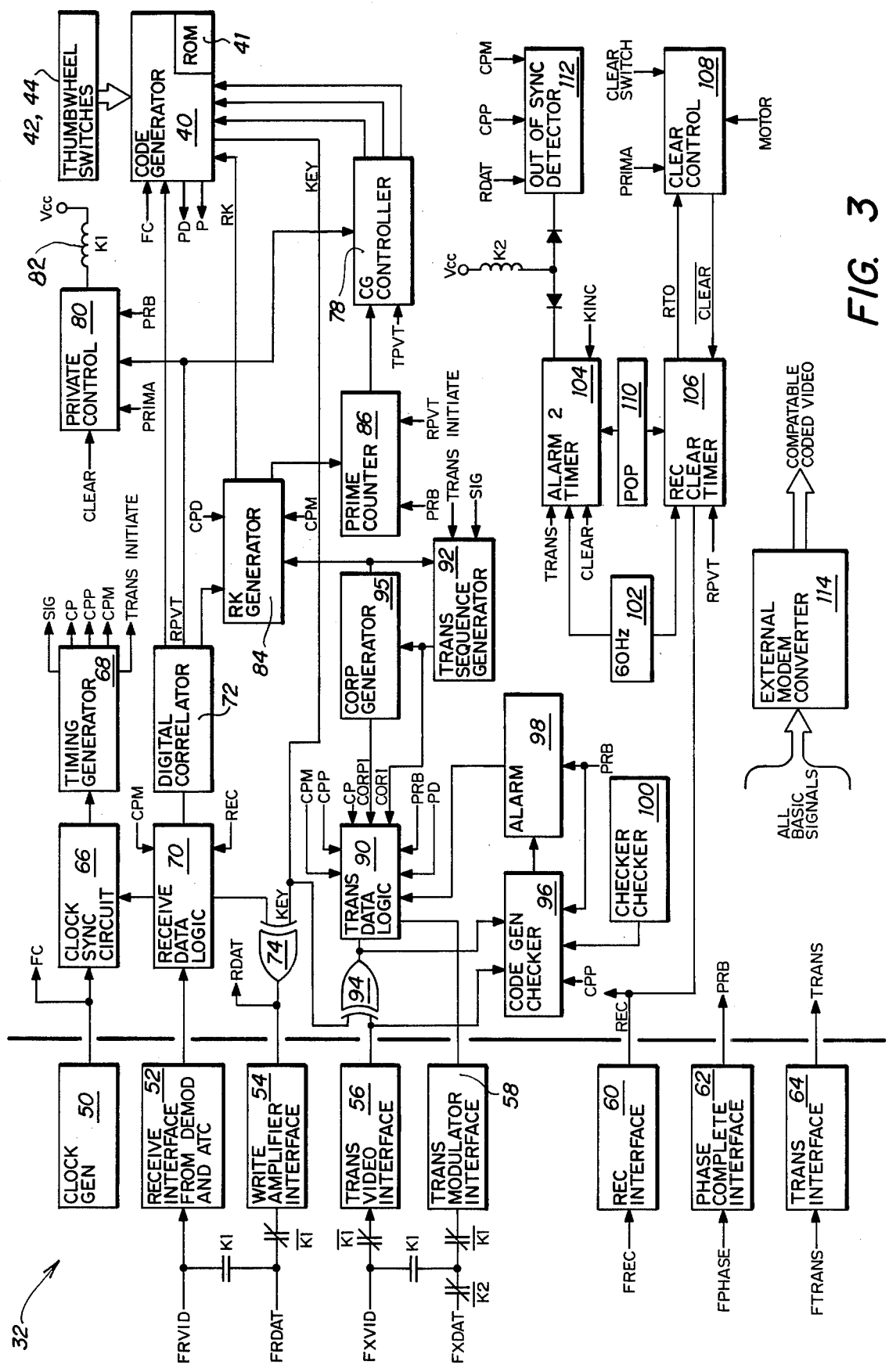
FIG. 3 is a more detailed block diagram of the scrambler system in accordance with FIG. 2.

The preferred embodiment of the invention will be described with respect to a facsimile transmission system. However, it will be understood that the present scrambler may be utilized with other types of synchronous data transmission systems with suitable modifications to interfacing circuitry. Referring to FIG. 1, a block diagram illustrating the interconnection of the present scrambler system within a conventional facsimile system is illustrated. Referring to FIG. 1, a conventional facsimile transmitter 10 is operated in order to convert a written document or other visual record into electrical signals and to transmit electrical signals over a communications link 12 to a remote facsimile receiver 14. The receiver 14 converts the facsimile electrical signal into a reproduction of the originally sent document record in the well known manner. It will be understood that the facsimile transmitter 10 and facsimile receiver 14 may comprise any one of a large number of different types of facsimile equipment manufactured or marketed by various companies such as Xerox Corporation, GSI Company, 3M Corporation, Victor Corporation, and the like.

A typical facsimile transmitter 10 includes a photocell video amplifier 16 which detects the output of a photocell which scans the document to be transmitted. The output of the amplifier 16 is normally applied to a transmitter modulator 18 for transmission over the communications link 12. When it is desired to utilize the present scrambling device, the interconnection between the amplifier 16 and the transmitter 18 is broken as schematically illustrated by the broken line 20, and the scrambler 22 is interconnected in series between the amplifier 16 and the transmitter 18. For the purposes of this disclosure, the output from the amplifier 16 is termed the FXVID signal which is applied to the input of the scrambler 22, and the resulting scrambled or enciphered data is termed the FXDAT signal which is applied to the transmitter 18 for transmission over the communications link 12.

In a conventional facsimile receiver 14, a demodulator 24 is provided to demodulate the signal received from the lines 12. Normally, a signal is applied from the demodulator 24 to the write amplifier 26 which generates control signals for the display portion of the facsimile system which physically reproduces the facsimile record. When it is desired to utilize the present scrambling device, the interconnection between the demodulator 24 and the amplifier 26 is broken, as illustrated schematically by the broken line 28, and a scrambler device 30 according to the present invention is connected in series with the demodulator 24 and the amplifier 26. For the purposes of this disclosure, the output from the demodulator 24 is termed the FRVID signal and is applied to the input of the scrambler 30, and the plain text output of the scrambler 30, which is termed the FRDAT signal, is applied to the amplifier 26. With the use of the scramblers 22 and 30 shown in FIG. 1, the data transmitted over the communication line 12 will comprise a nonsensical jibberish of digital data which will be unintelligible to the unauthorized person. However, the ciphered data is unscrambled by the scrambler 30 and the resulting output of amplifier 26 provides the identical facsimile document originally transmitted by the transmitter 10.

Thus, it will be seen that the present system may be very simply interconnected with an existing facsimile system without changing the basic operation of the facsimile system, yet while providing highly sophisticated enciphering of the facsimile data.

FIG. 2 illustrates in greater detail the various components of the present scrambling device. It will be understood that the scramblers 22 and 30 shown in FIG. 1 are identical, but may be utilized in either enciphering or deciphering modes. Consequently, throughout the present specification only one scrambling device will be described in detail.

Referring to FIG. 2, transmitted clear and coded video, received and decoded video, clock, receive/transmit and motor run data signals are transmitted from the facsimile machine 10 to an interface 32. Since each facsimile manufacturer independently handles the signals within each facsimile machine, facsimile machines are not standardized and each model machine has its own individual voltage levels with significant differences. Interfacing for the present scrambler is thus accomplished by a specialized group of interface printed circuit cards for adapting the present scrambler to each model of facsimile equipment.

The interface circuitry applies signals to a synchornizer 34 which is designed to initiate bit and frame synchronization to enable the receiving unit to acquire lock on to synchronization, by transmitting a highly redundant coded sequence having ideal correlation properties. A correlation detector for framing is used in the receive mode to provide a low probability of false alarm and a reasonable error tolerance for operation over degraded communication lines. The synchronizer 34 is also utilized to perform forward error correction coding and decoding of the key generator random start data. This data must be received error free in order for the key generator to obtain crypto-synchronization.

The synchronizer generates a signal to the controller 36 which monitors the various control signals coming from the facsimile machine and sequences all of the operations within the facsimile scrambler. The controller 36 contains a fail-safe alarm circuit used to continuously monitor the output of the enciphered bit stream to detect indications of key generator failure while in the private transmitting mode. In addition, the overall system has been designed in such a way that no single failure in the private mode can cause inadvertent transmission of clear text.

After the synchronization preamble has been completed, the controller 36 in the transmit mode causes the transmitted clear video signal to be quantized into black or white information at a rate of 2400 per second, thereby producing a 2400 bit-per-second data rate. In applications requiring a higher resolution and a lower error rate, an external synchronous data modem may be utilized. A 2400 Hz sampling rate results in a picture element size of approximately 0.01 inches in length which is considered adequate for most graphical information and standard typewriter fonts.

A key generator 40 generates a randomized keystream which is applied to the controller 36. After being digitized, the clear video data is enciphered or scrambled utilizing the random keystream. The enciphered signal is then fed to the facsimile machine transmitter modulator for transmission to the receiving unit via lines 12.

In the receiving mode, the facsimile modem output is fed as received video into the facsimile scrambler of the invention. The modem output is then synchronously detected by a bit decision circuit before being decoded utilizing an identical but locally generated key sequence at the receiver. The decoded video is then fed back to the facsimile machine, wherein it is utilized to drive the recording write amplifier 26 as shown in FIG. 1. The code for the day (CFD) key setting 44 comprises a thumbwheel switch which enables in excess of 2 million key settings or codes to be generated by the key generator 40. A ROM key setting 42 comprises a read only memory (ROM), which contains in excess of 16 million additional codes which may be selected by eight octal rotary switches inside the system with access protected by a double lock system on the rear panel of the unit. This dual level arrangement requires the security officer to develop various code administration techniques with separation of security responsibility, if desired. The key generator 40 is of the type described in U.S. Pat. No. 3,781,473, issued Dec. 25, 1973, which generates a nonlinear randomized keystream which provides very high security. The keystream is very complex due to the use of a multi-register, dynamically configured configuration with multi-step programming to produce each bit of key, as described in more detail in U.S. Pat. No. 3,781,473.

Operation of the system shown in FIG. 2 is fully automatic, thereby allowing completely unattended reception of both clear and private scramble messages intermixed with one another. Normal facsimile transmission in the private mode requires no special action on the part of the operator. Usually, the operator will be unaware that the scrambler is in use. If the operator chooses to send a picture or document in clear mode, the operator must make a special effort and depress the clear push button 38. The clear push button 38 must be depressed until the clear indicator comes on at the beginning of the transmission, afterwhich the clear indicator light will show that the machine is in the clear mode. The system has a special alarm circuit which monitors the output of the key generator 40 for a failure which would compromise the transmission. In addition, if there is a power failure or if other critical components in the scrambler fail during a transmission, the system goes into an alarm state and opens the transmit video path.

FIG. 3 provides a more detailed block diagram of the present system. In the description of the circuitry to follow, a number of input and output signals will be referred to. In order to assist in the understanding of the circuitry, the symbols for some of the signals are explained as follows:

RK: Request for Key
PVT: Private Mode
P: Prime Mode
FC: Fast Clock
CGD: Code Generator Data (Load or Prime)
IP: Initiate Prime
RP: Receive Prime
PD: Prime Data
KEY: Random Key Stream Output from Code Generator
PRB: Start Signal in Transmitter (Phase Complete Signal)
SIG: Command to Switch from Second Phasing Period to Third Phasing Period
COR1: Send Out Correlation Pattern
ENDW: Pulse Occurring at the end of each Correlation Pattern
PRIMA: Priming Complete
RPVT: (Receive Private) Pulse occurring at end of First Correlation Pattern
TPVT: (Transmit Private) Pulse occurring at end of First Correlation Pattern
CPM: Pulse train occurring at twice the normal data rate
CPP: Pulse Train occurring at a frequency equal to the data rate
TCVID: Coded Video
RTO: Receive Time Out
KINC: Normally Closed Contract of Relay K1
QVID: Quantized Video (Scrambled)
MREC: Received Data from External Modem
MDSR: Modem Data Set Ready
MSND: Modem Send (transmitted data to external modem)
MRTS: Modem Request to Send (goes to external modem)
MCARDET: Modem Carrier Detect from External Modem
SAMPLE: Same as CPP
REC: Receive
OOS: Out of Sync
POP: Power on Preset
CPB: Clear Push Button Signal
AL1: Alarm 1

Referring to FIG. 3, the interface 32 comprises a clock generator 50 which generates an approximate 300 KC clock signal. On certain facsimile machines, such as the Graphic Sciences facsimile machine, a satisfactory clock rate is provided without requiring the use of the clock generator 50. The receive interface 52 comprises the interface from the demodulator 24 of the facsimile system when in the receive mode. Interface 52 may be connected to the modem internal to the facsimile machine or to an external modem if desired. The write amplifier interface 54 applies the FRDAT signal to the write amplifier 26 and operates to convert the TTL level decoded video to a signal level which is compatible with the facsimile machine recording amplifier input. A normally open relay contact K1 is connected across the receive interface 52 and interface 54. A normally closed relay contact $\overline{K1}$ is connected in series with the output of the interface 54.

The interface 32 further comprises a transmit video interface 56 which is connected to receive the FXVID signal from the photocell video amplifier 16 (FIG. 1). The interface 56 quantizes the video signal into black and white information and converts the signal to a TTL signal level. A normally closed relay contact $\overline{K1}$ is connected in series with the input to the interface 56. A transmit modulator interface 58 generates the FXDAT signal which is applied to the transmitter modulator 18 (FIG. 1). The interface 58 converts the TTL scrambled video output to a signal level which is adequate to drive the transmit modulator. The FXDAT output is applied through normally closed relay contacts $\overline{K1}$ and $\overline{K2}$. A normally open relay contact K1 is connected across the input of interface 56 and the output of interface 58. The interface 32 further includes a receive interface 60 which receives the FREC signal to place the present facsimile system in the receive mode. The FREC signal is analogous to carrier present in the internal receive demodulator. The phase complete interface 62 receives the FPHASE signal to generate the PRB signal in the transmit mode only to indicate to the system that the facsimile machine is ready to phase the scramblers. The transmit interface 64 receives the FTRANS signal to generate the TRANS signal which is a redundant signal for checking on the operation of the facsimile machine in the transmit mode. The TRANS signal is applied at the beginning of transmission of the signal.

Referring to the remainder of the system shown in FIG. 3, the output of the clock generator 50 is applied to a clock sync circuit 66 which includes a digital phase lock loop to add or subtract pulses from the clock generator 50, depending upon where a data transition occurs. Circuit 66 is operable in response to detection of the REC signal generated by the interface 60 to attempt to servo and to phase with the signal received from the receive data logic 70. Circuit 66 drives a timing generator 68 which generates control signals to initiate transmission, begin and stop correlation, and the like.

The output from the interface 52 is applied to a receive data logic 70 and applies signals to a digital correlator 72. Signals are also applied from the receive data logic 70 to the clock sync circuit 66. As will be subsequently described, special auto correlation patterns are generated during transmission initialization in order to indicate to a signal receiver that a private message follows. This pattern is recognized by the correlator 72 in a manner to be subsequently described in detail. Correlator 72 also detects start signals in a manner to be subsequently described. Correlator 72 generates the CGD signal which is applied to the random code generator 40 (FIG. 2). As previously noted, the code generator 40 is set to a predetermined code by operation of thumbwheel switches 42 and 44 in order to generate a randomized stream of digital bits termed key. A read only memory (ROM) 41 may be utilized in combination with the code generator 40 to increase the complexity of the code provided thereby. The key bit stream is applied to one input of an exclusive OR gate 74. The second input of the gate 74 is connected to receive the output of the receive data logic 70. In the well known manner, gate 74 performs modulo-2 addition to perform deciphering of the scrambled signal received by the logic 70. Code generator 40 also generates a random prime signal which controls the selective inversion of correlation patterns during the initialization procedure of the system.

The RPVT output signal is also generated from the digital correlator 72 and is applied to control the code generator controller 78 and the private control circuit 80. Controller 78 generates the PVT, IP and RP signals and applies them to the code generator 40. The private control 80 monitors the RPVT and TPVT signals and operates the relay K1 at the proper time to place the system in the private mode. In the transmit mode, K1 is actuated at the end of period one of the phase acquisition sequence to be subsequently described. In the receive mode, K1 is actuated at the end of period five of the phase acquisition sequence to be subsequently described.

The private control 80 controls the energization of the K1 relay coil 82 which controls the K1 contacts previously described. Private control circuit 80 is responsive to $\overline{CLEAR}$, PRIMA, and PRB signals applied thereto. The CT15 signal is applied from the digital correlator 72 to the RK generator 84 which generates the RK request for key signal to the code generator 40. In addition, generator 84 generates the RPRK signal which is applied to the prime counter 86. Counter 86 counts the number of prime bits received or transmitted. When the 24th prime bit is counted, the PRIMA signal generated thereby is turned off, and the scrambling process is started. The PRIMA signal is applied to the code generator controller 78.

The output from the transmitter video interface 56 is applied through the exclusive OR gate 94 to the transmit data logic 90 which is controlled by the transmit sequence generator 92. Logic 90 gates the proper signals in sequence and in the right timing to the transmit modulator interface 58. Gate 94 also receives keystream data from the code generator 40 in order to provide the enciphering for the FXVID signal. The CORP generator 95 generates the AC pattern and the frame timing signal ENDW for application to the RK generator 84. Generator 95 also generators the CORP1 signal in response to the CORI signal generated by the generator 92.

The code generator checker 96 monitors the output from transmit video interface 56 and the coded transmit data from the gate 94 and continuously compares the signals. If these two signals are alike, or the inverse of one another, for 128 contiguous bits, the code generator is assumed to be stuck at logic one or zero and the alarm 98 is energized. This causes logic 90 to be blocked to prevent the transmission of unscrambled data. A checker 100 monitors the operation of the checker 96. During a certain period of the clock phase acquisition, to be subsequently described, the condition for alarm is present since no key data is present. Thus, the checker 96 is allowed to go into alarm momentarily during each clock phase acquisition. If the checker 96 has not caused the alarm 98 to go into alarm by the time the priming sequence is complete, the checker 100 causes the checker 96 to be forced into the alarm state. This alarm state may be reset only by turning off the facsimile transmitter. Thus, the checker 100 continuously monitors the proper operations of the checker 96 and the alarm 98.

A Schmidt trigger 102 applies clock signals to an Alarm 2 timer 104 and a receive clear timer 106. Timer 104 derives its time base from the trigger 102, which receives 60 Hz signals from conventional A.C. power lines. Timer 104 requires approximately 25 seconds to time out during the transmit mode. If timer 104 times out and the system is neither in the clear or private mode, the timer will energize relay K2. This causes relay contact K2 to be opened, thereby breaking the transmit video line and preventing the transmission of FXDAT from interface 58. In addition, the alarm horn in sounded. The timer 104 is not reset until the facsimile transmitter is turned off.

The receive clear timer is set to time out approximately 15 seconds after the REC signal comes on. If after 15 seconds the receiving system has not detected the start signal, the system is forced to the clear mode. The clear control circuit 108 determines whether or not the system should be in the clear or private mode according to conditions of the PRIMA and clear switch signals applied thereto.

The POP circuit 110 operates only when the system is in operation and a sudden momentary loss of power is detected. When the system is in the transmit mode, the POP circuit 110 will operate the timer 104 to place the system in the alarm state.

If the system is in the receive mode, the POP circuit will operate the timer 106 to place the system in the clear mode.

The out of sync detector 112 is particularly useful with a facsimile machine having a reverse channel or a full duplex signal. This circuit detects when the interconnected facsimile transmitter and receiver are out of sync with one another. The basis of operation of the detector 112 is that relatively long stretches of black or white data will generally exist in the clear facsimile data. Thus, the detector 112 at the receiving station, as will be subsequently described, detects the deciphered data RDAT and counts up four if two consecutive bits are alike and counts down five when two consecutive bits are not alike. As different types of data may require different ratios, structure may be provided to change the count up/down ratios utilized. All ratios will count up less rapidly than down. When the systems are out of sync, random data will be transmitted and thus the detector 112 will promptly count down to zero within 2 or 3 seconds. The out of sync signal OOS is then generated to energize K2 at the receiving station. The receiving station then transmits the necessary signal via the duplex line to stop transmission at the transmitting station. Signal OOS also generates an alarm.

The present system can operate with the internal modem of the facsimile machine at a low data rate. If additional resolution is required, an external modem may be used at a higher data rate by connecting the modem to the external modem convertor 114 which receives all of the basic signals previously described and generates a compatible coded video output signal for application to the external modem. In this way, a conventional modem may be utilized in conjunction with the present system by merely plugging into the modem.

FIGS. 4a–4j illustrate various waveforms which occur in the scrambling system during the initialization and synchronization procedure prior to facsimile scrambling. Referring to FIG. 4j which is the signal applied through the transmit interface 58, it will be seen that the synchronization sequence comprises six phasing periods. The first phasing period is a function of the facsimile machine and usually occurs during the first 15 seconds after a transmission is started. In certain machines, various handshake functions may occur during this period. During the first phasing period, the present enciphering system is locked out and the facsimile machine operates in the normal clear mode. The phasing period one is terminated by the phase complete signal. After the completion of this first period, if the clear push button 38 (FIG. 2) is pushed, the transmitter will go to the clear mode and the periods two through six are omitted. On certain facsimile machines which do not use a handshake, the phasing of the facsimile machine will overlap the phasing periods and will actually be completed during period six.

A translation from period one to period two is initiated by the PRB signal shown in FIG. 4f. Referring to FIG. 4j, the second period is termed the clock phase acquisition period. The phase complete signal (PRB) is shown in FIG. 4f and initializes the transmit sequence generator 92. For approximately the first second of operation, 1024 bits of alternating ones and zeroes are transmitted at 1200 baud through the transmit data logic 90, and the transmitter modulator interface 58 (FIG. 3). This signal is transmitted to the receiver unit and is used to phase lock the clock in the receiver to the clock in the transmitter.

The transition from the second phasing period to the third phasing period is triggered by the SIG signal shown in FIG. 4e. The ENDW signal shown in FIG. 4c comprises a pulse which occurs at the end of each correlation pattern. Period three of the initialization sequence is termed the matched filter setup and comprises 15 bits of all zeroes at 1200 baud. This is transmitted from the generator 92 and is used to clear the digital correlator in the receiver and prevent early or false indications of the start signal.

Period four of the initialization sequence shown in FIG. 4j is termed the start signal (CORP1) which comprises a special 15 bit autocorrelation pattern with well defined characteristics which is utilized to signal the receiver that a private message follows. A single bit error can occur anywhere in the pattern and recognition will still occur. In the preferred embodiment, the autocorrelation pattern comprises a 15 bit pattern sent at the desired data rate and the pattern is generated by the CORP generator 95. In the receiving unit, the autocorrelation pattern is recognized by the digital correlator 72. The autocorrelation pattern is initiated by the generation of the COR1 signal shown in FIG. 4d. The transition from period four to period five is initiated by the prime signal IP or RP as shown in FIG. 4i and TPVT and RPVT as shown in FIG. 4a.

Period five of the synchronization sequence shown in FIG. 4j is termed the code generator prime period. During this period, the prime state in the transmitter code generator 40 is transmitted to the receiver code generator. This transfer is accomplished utilizing a highly redundant code format comprising 24 of the 15 bit correlation patterns, or 360 bits. These bits are transmitted during period five to thereby transmit the prime state in the transmitter code generator 40 to the receiver code generator. The 360 bits are sent either upright or inverted depending upon the value of the prime bit being transmitted. For example, if a prime bit is a logic zero, the pattern at that instant is sent upright, or the same as a start signal. If the prime bit is a logic one, the correlation pattern is sent inverted, or the one's compliment of the start signal.

This series of patterns are received by the digital correlator 72 at the receiving system. The correlator 72 will designate a receive correlation pattern as a logic one, if eight or more ones are detected in the pattern. The received prime pattern will be termed a logic zero if seven or less ones are detected, in relation to a standard upright prime pattern. Twenty-four ENDW pulses as shown in FIG. 4c will be transmitted during the code generator prime period.

The sixth period of the synchronization sequence is termed the coded video period and comprises the final period that the system goes to after being initialized. The sixth state lasts for the remainder of the transmission. During this period, coded picture information is transmitted through the interface 58 as the FXDAT signal. This period is initialized by the prime counter 86 having counted 24 bits of prime and raising the $\overline{\text{PRIMA}}$ signal to one, as shown in FIG. 4b. Translation of the system into the receive mode is initiated by the PVTRY signal shown in FIG. 4g.

When the system is in the receive mode, the clock sync circuit 66 detects the REC signal generated from the interface 60 and the circuit begins attempting to servo into phase with the signal being received. The 1024 bits in period two contain more than three times enough information in order to synchronize the worse case. The receiver continually looks for the start signal beginning at period four. As soon as the digital correlator 72 detects the start signal, the receiver goes into the receive private or (RPVT) mode and stands by to receive prime. Upon completion of the priming period, $\overline{\text{PRIMA}}$ goes high and the receiving system detects the incoming information until the REC signal goes low and the system is placed in the standby mode. The receiving system will automatically go to clear after a predetermined time (depending on the facsimile system in use) if the start signal is not recognized previous to that time.

FIG. 5 illustrates waveforms generated by the circuitry shown in FIG. 3 during the prime data transfer. Referring to FIG. 5a, the code generator data signal (CGD) is generated by the digital correlator 72 as illustrated. This pulse occurs during the ENDW period. When the CGD signal is high, the pulse represents a prime bit one and a low represents a prime bit zero.

FIG. 5b illustrates the TCVID or coded video signal, while the prime data (PD) signal as shown in FIG. 5c represents bit 23 and bit 24. The request for key (RK) is illustrated in FIG. 5d and is generated by the RK generator 84 in order to request random keystream data from the code generator 40. The ENDW signal shown in FIG. 5e is generated from the CORP generator at the end of each correlation pattern.

The CPP pulse train, shown in FIG. 5f, has a frequency equal to the data rate and the CPM pulse train shown in FIG. 5g occurs at twice the normal data rate. The PRIMA signal transitions after the priming is complete.

Figure 6:
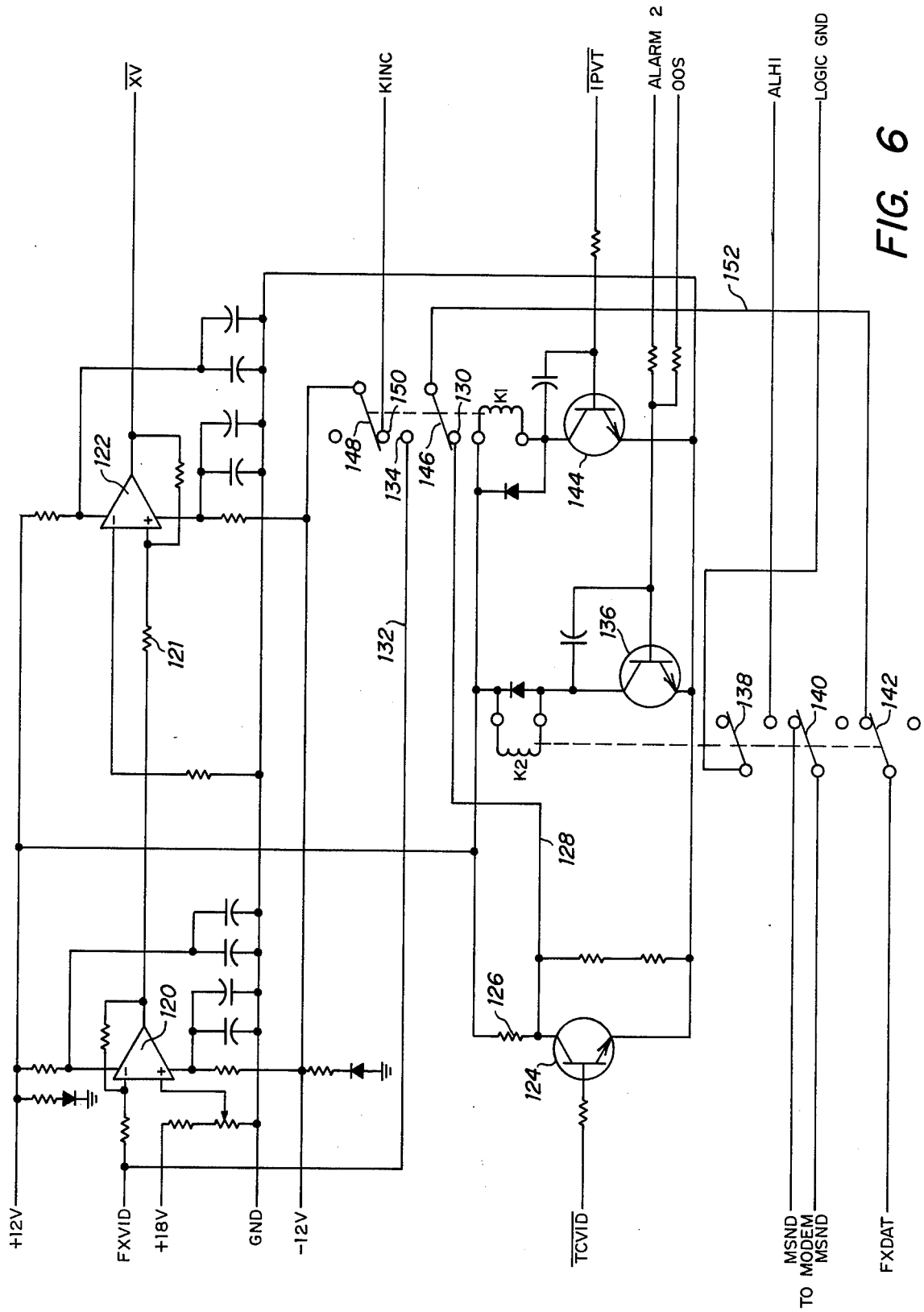
FIGS. 6–8 are schematic diagrams of an interface circuit particularly adapted for use with a particular facsimile machine.

FIG. 6 is a schematic diagram of a transmitter video interface specifically tailored for interfacing with a Xerox TC2 or TC3 Telecopier manufactured and sold by Xerox Corporation. It will be understood that other interfaces will be provided for use with the invention for interfacing between facsimile machines of different types.

Referring to FIG. 6, the FXVID signal derived from the photocell video amplifier 16 (FIG. 1) is applied to an input of a voltage translator 120, the output of which is applied through a resistance 121 to an input of a Schmidt trigger 122. Schmidt trigger 122 changes the translated voltage from the gray scale to logic ones and zeroes and applies pulses to the $\overline{\text{XV}}$ terminal to be shown in FIG. 7. The TCVID coded video signal is applied to be base of a transistor 124, the output of which is applied through a resistor 126 to relay coil K1. The collector of transistor 124 is also applied via lead 128 to relay switch terminal 130. The FXVID signal is also applied via lead 132 to relay switch terminal 134. Transistor 124 converts the TTL signal to a suitable level.

A transistor 136 is connected to receive at its base the alarm two signal. The relay K2 is connected to the collector of transistor 136 and is operable to be energized upon the receipt of the alarm two signal by transistor 136. Relay K2 controls three ganged relay switches 138, 140 and 142.

A transistor 144 is connected to receive the IPVT signal in order to control the operation of relay K1 connected to the collector of the transistor 144. Relay K1 controls the operation of relay switches 146 and 148. Relay switch 148 is normally closed against contact 150 connected to the KINC terminal. Relay switch 146 is normally connected against contact 130 and is tied via lead 152, which is normally contacted by relay switch 142, in order to generate the FXDAT signal. The MSND signal is applied through normally closed relay switch 140 to generate the to modem MSND signal.

Figure 7:
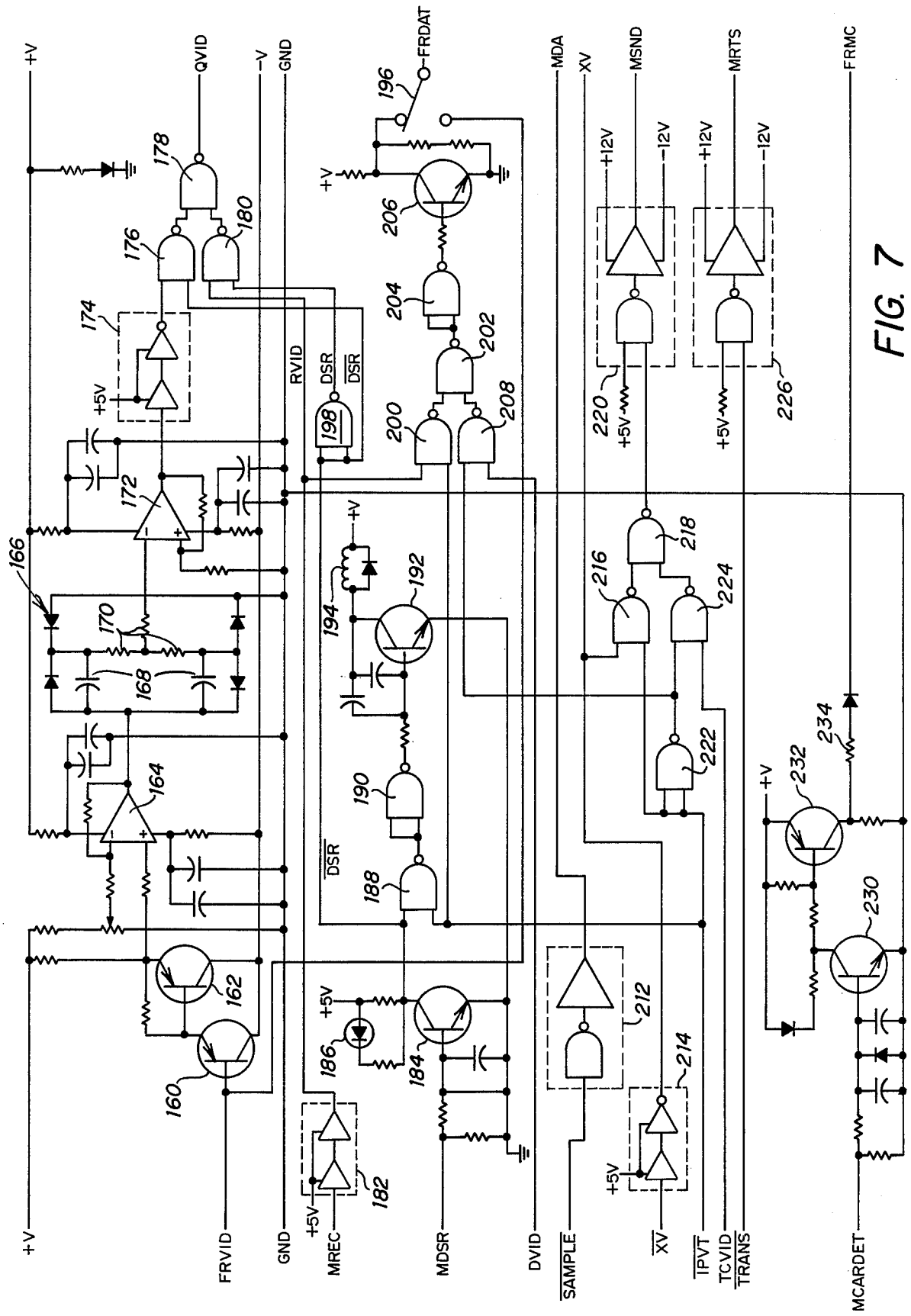

In operation of the interface circuitry shown in FIG. 6, the FXVID signal is normally applied through the voltage translator 120 and Schmidt trigger 122 for application to the $\overline{\text{XV}}$ terminals of the interface circuit shown in FIG. 7. In the clear mode, and during period one of phasing and standby, relay K1 is energized in response to transistor 144, and the FXVID signal is applied through terminal 134, relay switch 146 and through line 152 as the FXDAT signal. In the private mode, the relay K1 is de-energized in order to maintain the relay switch contact 146 in the illustrated position in order to prevent the transmission of the FXDAT signal in the clear mode. In case of power failure, the system is thus maintained in the private mode so clear data is not inadvertently output. Upon receipt of the Alarm 2 signal, the transistor 136 controls the relay K2 in order to open the relay switches 138, 140 and 142 in order to prevent the transmission of clear signals and to generate the alarm signal ALHI and to open the MSND signal path to the modem, to prevent generation of private data in the clear.

FIG. 7 is a schematic diagram of the receive interface for use with a Xerox TC2 and TC3 facsimile transmission system. The FRVID signal shown in FIG. 1 as being received from the demodulator 24 of the facsimile receiver, is applied to the base of a transistor 160. The emitter of transistor 160 is connected to the base of transistor 162. Transistors 160 and 162 serve as an impedance conversion circuit for the input signals. The emitter of transistor 162 is connected to the positive input of an amplifier 164 which serves to center the input signal about zero volts. The output of amplifier 164 is applied to an automatic threshold control circuit 166 which comprises capacitor 168, resistors 170 and associated diodes. The output of the automatic threshold control circuit is applied to the negative input of a Schmidt trigger 172 which generates an output pulse train of logic ones and zeroes. The amplifier and Schmidt trigger 164 and 172 may comprise, for example, SN72741P devices.

The output of trigger 172 is applied through a conversion circuit 174 which converts the pulse train to TTL. The convertor circuit 174 may comprise, for example, an SN75154N device. The output of the convertor 174 is applied to an input of a NAND gate 176, the output of which is applied to a NAND gate 178 to generate the QVID signal. A NAND gate 180 receives the RVID and DSR signals and applies an input to gate 178. Gates 176, 178 and 180 operate as a single pole, double-throw switch to selectively connect the MREC modem output as the QVID signal when desired. The MREC signal is applied through a convertor circuit 182 to provide the RVID signal which is applied to gate 180. Circuit 182 may comprise, for example, an SN75154N interface device.

The modem data set ready (MDSR) signal is applied to the base of a transistor 184, the collector of which is applied to energize the light emitting diode 186 and applied as an input to a NAND gate 188. The output of gate 188 is tied to the inputs of a NAND gate 190, the output of which is applied to the base of a transistor 192. The collector of transistor 192 is connected to control a relay coil 194. Relay coil 194 controls the operation of a relay switch element 196.

The output of transistor 184 is also connected to the inputs of a NAND gate 198, the output of which generates the data set ready ($\overline{DSR}$) signal which is applied to an input of gate 180. The input of gate 198 is applied as the $\overline{DSR}$ signal which is applied as an input to gate 176. The output from transistor 184 is also applied as an input to a NAND gate 198. The RVID signal is applied to gate 200, the output of which is connected through NAND gates 202 and 204 in order to control transistors 206.

The DVID signal is applied as an input to a NAND gate 208, the output of which is attached as an input to gate 202. The $\overline{SAMPLE}$ signal is applied to an interface circuit 212 which may comprise, for example, an SN75150P circuit. The output of circuit 212 is applied as the MDA signal which serves as a modem clock. The $\overline{SAMPLE}$ signal comprises a internal clock which drives the circuit 212.

The $\overline{XV}$ signal previously generated in the circuitry shown in FIG. 6 is applied to a conversion circuit 214, which may comprise an SN75154N circuit, and which operates to convert the $\overline{XV}$ signal into TTL. The XV signal is applied as an input to a gate 216, the output of which is applied through a NAND gate 218 to an SN75150P circuit 220 in order to generate the MSND signal. The $\overline{IPVT}$ signal is applied as an input to gate 216 and is also applied through gate 222 to an input of gate 224 to an input of gate 208. The output of gate 224 is applied as an input of gate 218. The signal TCVID is also applied as an input to gate 224.

The $\overline{TRANS}$ signal is generated upon depression of the transmit button on the facsimile machine and is applied through an SN75150P device to generate the MRTS request to send signal. The modem carrier detect signal MCARDET is applied to the base of a transistor 230, the output of which is applied to the base of a transistor 232. The collector of transistor 232 is applied through a resistor 234 as the FRMC signal for turning the facsimile machine on. The transistors 230 and 232, along with their associated circuitry, allow the use of an external modem when improved resolution is desired.

In operation of interface circuitry shown in FIG. 7, the FRVID signal applied through the impedance convertors 160 and 162 and through amplifier 164 and Schmidt trigger 172 in order to generate the QVID signal at the output of gate 178. Upon the generation of the MDSR signal, when the system is using an external modem, transistor 184 is turned on and causes the $\overline{DSR}$ signal to go low. The DRS signal level applied to gate 180 thus goes high to indicate when the external modem is ready. Gate 176 then blocks the transmission of the FRVID signal through gate 178. When it is desired to use the internal modem, DSR turns on gate 180 to allow RVID to pass, while blocking FRVID. When transistor 192 is inhibited, the relay 194 is de-energized. This allows the RVID signal to be applied through gates 200, 202 and 204 and transistors 206 to serve as the FRDAT signal. When the transistor 192 is conductive, relay 194 is energized and the relay switch on 196 is moved such that the FRDAT signal is generated as the FRVID signal. When the system is in the private mode, the RVID signal is blocked, while the DVID signal is applied as the FRDAT signal through gates 208, 202, 204 and transistors 206.

Figure 8:
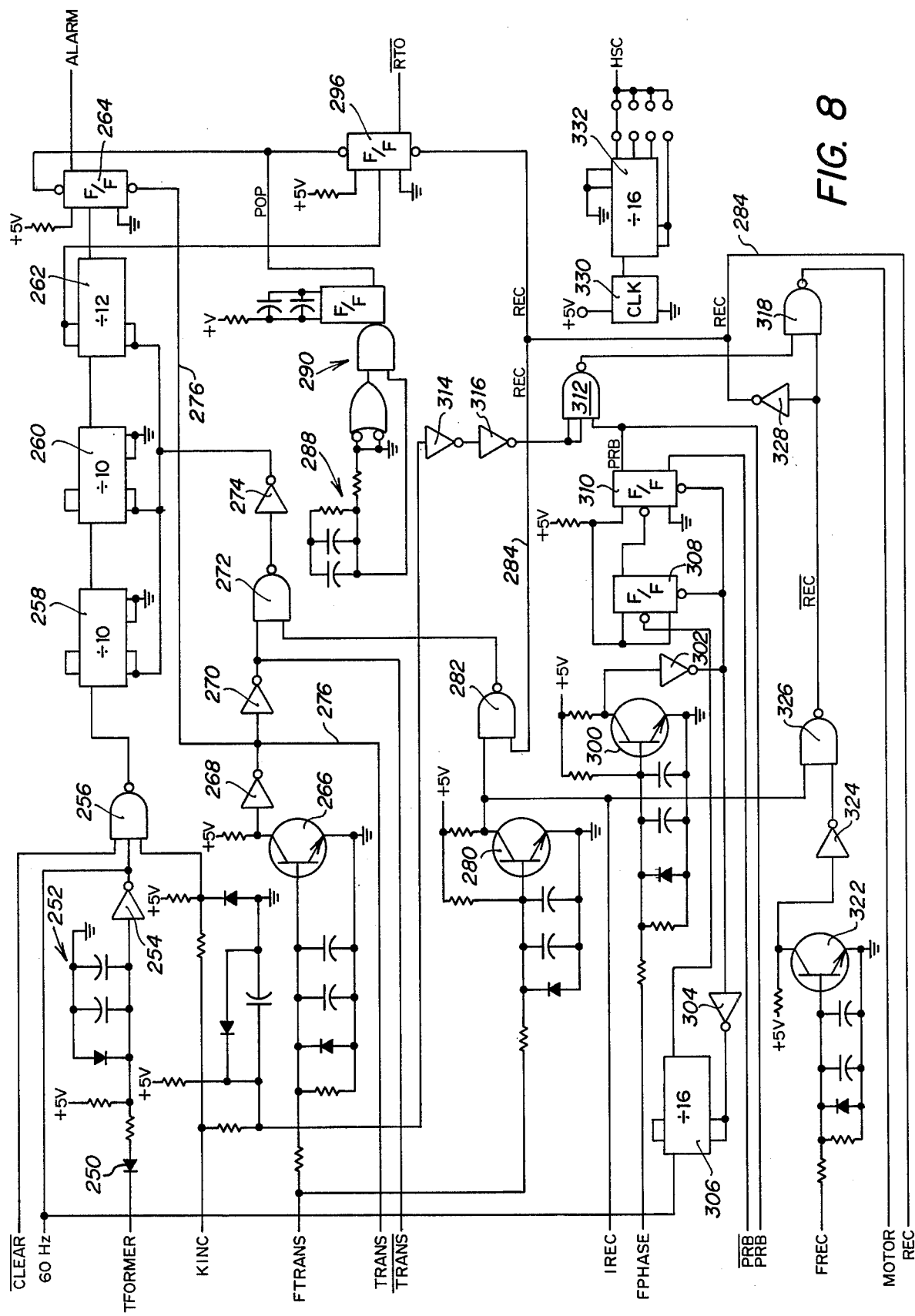

FIG. 8 illustrates the remaining circuitry comprising the interface for the Xerox TC2 and TC3 Telecopiers. Sixty cycle per second A.C. signals are applied from a transformer through a diode 250, through a capacitor network 252 and through an invertor 254 to the input of a NAND gate 256. The $\overline{CLEAR}$ signal is also applied to the input of gate 256, along with the KINC signal. The output of gate 256 is applied to a divider network comprising a divide-by-10 circuit 258, a divide-by-10 circuit 260 and a divide-by-12 circuit 262. The divider circuits 258 and 260 may comprise for example SN7490N dividers while the divider circuit 262 may comprise for example the SN7492N divider. The output of divider circuit 262 is applied to a flipflop 264 which is operative to generate the alarm two signal.

The KINC signal represents the normally closed K1 relay previously shown in FIG. 6. If the circuitry is in the clear mode, the gate 256 is turned off. The FTRANS signal is applied to the base of a transistor 266, the collector of which is applied through invertors 268, 270 to a NAND gate 272. The output of gate 272 is applied through an invertor 274 to a divider network. The FTRANS signal is applied via lead 276 to the flipflop 264.

The FTRANS signal comprises plus 18 volts to designate transmission, zero volts to designate stand-by and minus 18 volts to designate receive. The dividing circuit 258, 260 and 262 serve as a timing circuit, such that if the system does not go into private or clear in the transmitting mode within a 22 second period, the flipflop 264 generates the Alarm 2 signal to turn on the alarm.

The FTRANS signal is also applied to the base of a transistor 280, the collector of which is applied through a NAND gate 282 to the input of gate 272. The receive (REC) signal is applied via lead 284 to an input of gate 282. An RC circuit 288 is interconnected with a multielement one shot multivibrator 290, which may comprise a SN74121 one shot, to generate the POP signal which is applied to flipflop 264. The POP signal is also applied to set flipflop 296 which generates the $\overline{RTO}$ signal. The REC signal is also applied to reset the flipflop 296.

The FPHASE signal is applied to the input to the base of a transistor 300, the collector of which is applied through invertors 302 and 304 to a divide-by-16 divider 306. The output of divider 306 is applied to the clock input of a flipflop 308 which is interconnected with a flipflop 310. The Q output of flipflop 310 is applied as an input to a NAND gate 312. The KINC input is applied through invertors 314 and 316 as additional inputs to gate 312. The output of gate 312 is applied as an input to a NAND gate 318, the output of which comprises the motor signal.

The FREC signal is applied to the base of a transistor 322, the collector of which is applied through an invertor 324 as an input to a NAND gate 326. The output of transistor 280 is also applied as an input of gate 326. The output of gate 326 is applied as an input of gate 318 and is applied through an invertor 328 to generate the REC signal.

A clock 330 generates a 4.9152 MHz clock signal to a divide-by-16 divider 332 which counts down the clock signal to generate the 300 Hz HSC clock signal. When the system is in the transmit mode, the divider 306 and flipflops 308 and 310 are driven by the FPHASE signal. One-half second after the transmitter has been turned on, the circuitry counts out and the flipflop 310 is turned on in order to generate the PRB signal at the Q terminal thereof. When the circuitry is in the receive mode, the divider 262 times out after 3.2 seconds and therefore places the system in the clear mode by operating the flipflop 296.

As previously noted, when the FTRANS signal is positive 18 volts, the transmit mode is indicated and transistor 266 is turned on. When the FTRANS signal is minus 18 volts, the receive mode is indicated and the transistor 280 is turned off. For the transmit mode, the FPHASE signal is a redundant signal for the FTRANS signal and initiates the PRB in the manner previously described.

If the divider 306 fails due to a malfunction or the like, the circuitry never times out and the circuitry is not allowed to go into the private mode. If the divider 306 or associated circuitry fails, the dividers 258, 260 and 262 provide a back up and place the system in the alarm mode. Thus, the present system provides redundant check circuitry to prevent a malfunction of the system such that sensitive data is not sent out in case of malfunction.

FIG. 9 illustrates in schematic detail the power supply circuitry of the invention. A.C. voltage is applied across a rectifying diode bridge 350, the output of which is applied through amplifier 352 and 354 to generate a D.C. output. The amplifiers 352 and 354 may comprise for example SN7812N amplifiers. The BITP signal, which comprises a clock signal derived from the clock circuitry of the invention, is applied to a divide-by-16 divider 356 which applies outputs to a divide-by-10 divider 358 and a divide-by-8 divider 360. A switch arm 362 is movable into connection with either the output of divider 358 or divider 360 to provide the CPM signal. The output of divider 358 comprises a 2048 Hz signal, while the output of divider 360 comprises a 2400 Hz signal. The signal chosen by the switch arm 362 will depend upon the type of facsimile machine being utilized in conjunction with the present scrambler device.

Referring to FIG. 10, a schematic diagram of the synchronizer circuit 34 (FIG. 2) is illustrated. The $\overline{PRB}$ signal is applied to lead 370 connected to a divider circuit comprising a divide-by-2 flipflop 371, a divide-by-16 divider 372, a divide-by-16 divider 374 and a divide-by-4 divider 376. The dividers 372–376 may comprise, for example, SN7493N dividers. The flipflop 371 may comprise, for example, an SN74107N flipflop. The divider circuit counts 1024 bits with alternate ones and zeroes. Dividers 371 and 376 are connected as inputs to a NAND gate 378, the output of which is applied to a flipflop 380. Flipflop 380 generates the PRB signal and the SIG and $\overline{SIG}$ signals, which provide a command switch from the second phasing period to the third phasing period, as shown in FIG. 4e.

The CPP and CPM signals are applied to the divider circuitry. The Q7 signal is applied as an input to a NAND gate 382, the output of which is applied through NAND gate 384 to generate the R2 signal. The request for key (RK) generator 84 (FIG. 3) comprises a NAND gate 386 which receives the CT15, P and CG signals. The output of gate 386 is applied through an invertor 388 to a D-flipflop 390. The CPM signal is applied through an invertor 392 to flipflop 390. The CPP signal is applied through an invertor 394 to a NAND gate 396. Gate 396 generates the PRK signal through an invertor 398 and is connected as an input to a NAND gate 400. The Q terminal of flipflop 390 is applied as a second input to gate 400. The output of gate 400 is the request for key RK signal previously noted.

The prime counter 86 previously shown in FIG. 3 comprises a divide-by-12 divider 406 which may comprise for example a SN7492N divider. The prime counter further includes a divide-by-2 flipflop 408 which is interconnected with a flipflop 410. The Q output of flipflop 410 is connected via lead 412 as an input to gate 396. This circuit serves to count the number of prime bits received or transmitted. When the 24th bit is counted the PRIMA signal generated at the $\overline{Q}$ output of flipflop 410 is turned off, and the scrambling process of the invention is started.

The CG control at 78 previously shown in FIG. 3 comprises NAND gates 416 and 418 which receive the PRIMA signal from flipflop 410, and RPVT signal and the TPVT signal. The output of gate 416 is applied through an invertor 420 to generate the RP signal. The output of gate 418 is applied through a NAND gate 422 to generate the IP signal. In addition, the TCC generator includes a NAND gate 424 which receives the $\overline{PVT}$ signal and the $\overline{SIG}$ signal to generate the TCC signal. The CG controller also includes a NAND gate 426 which receives the $\overline{RPVT}$ signal and the $\overline{TPVT}$ signal to generate the PVT signal. The CG controller 78 thus generates the necessary control signals for operation of the code generator 40 previously shown in FIG. 3.

The correlation pattern generator generates the correlation pattern previously noted and the block timing signal ENDW. The correlation pattern generator 95 previously shown in FIG. 3 includes a four stage shift register generator 430 which may comprise for example a SN74195N shift register. The generator 430 thus generates the CORP1–CORP4 signals to a four input NOR gate 432 which generates the ENDW output applied to the inputs of NAND gates 434 and 436. The transmitter sequence generator 92 (FIG. 3) comprises gates 434 and 436, along with the following circuitry. The output of gate 434 is applied to the clock input of a D-flipflop 438 which is interconnected with a D-flipflop 440. The Q output of flipflop 440 comprises the $\overline{RPVT}$ signal. The output of gate 436 comprises the $\overline{ENDW}$ signal which is applied to clock the flipflop 440. The Q output of flipflop 438 generates the COR1 signal shown in FIG. 4d. It will thus be seen that the circuitry shown in FIG. 10 operates to provide synchronization for the system in the manner previously described in FIG. 3 and as illustrated by waveforms 4a–4j.

FIG. 11 illustrates the transmit logic portion of the controller 36 previously shown in FIG. 2. The HSC square-wave previously identified is applied through a NAND gate 460, the output of which is applied to a one shot multivibrator 462, which may comprise, for example, a SN74123N circuit. The output of multivibrator 462 comprises the FC2 and $\overline{FC2}$ fast clock signal. The output of gate 460 is also applied to a one shot multivibrator 466 which operates to generate the fast clock signals FC1 and $\overline{FC1}$.

The CPP signal is applied to the transmit data logic 90 (FIG. 3) which includes a D-flipflop 482 which receives the XV signal previously generated. A NAND gate 484 receives the CPP signal and is also applied to the input of gate 472. The CPP signal is applied through a NAND gate 486 to generate the $\overline{SAMPLE}$ signal. The P terminal of flipflop 482 is connected to the $\overline{PRIMA}$ signal, while the C terminal of the flipflop 482 generates the ALARM signal. The Q terminal of flipflop 482 is connected to the exclusive OR gate 94 (FIG. 3) for modulo-2 encoding. The output of gate 94 is applied to a NAND gate 490. The $\overline{PRIMA}$ signal is applied as an input of gate 490, along with the TPVT signal.

The output of gate 490 is applied to a NAND gate 492, the output of which is applied to the D terminal of a D-flipflop 494. The PD and IP signals are applied to inputs of a NAND gate 496 and the output of gate 496 is applied to an exclusive OR gate 498. The CORP1 signal is also applied as an input to gate 498. The output of gate 498 is applied to an input of a NAND gate 500, the output of which is applied as an input to gate 492. The COR1 and PRIMA signals are applied as other inputs to gate 500. The PRIMA signal is applied through NAND gate 502 to an input of gate 490 and to the P terminal of flipflop 482. The random keystream is applied as an input to gate 94 and the CP signal is applied as an input to NAND gate 504, the output of which is applied as an input to gate 492. The $\overline{TCVID}$ is applied from a $\overline{Q}$ output of flipflop 494, while the TCVID signal is applied from the Q output thereof. The transmit control logic 90 is thus controlled by the transmit sequence generator 92 previously described in order to gate the proper signals in sequence and in the correct timing to the transmit modulator interface 58 (FIG. 3).

Another portion of the transmit data logic 90 includes circuitry for determining whether or not the system is in the clear or private mode. The circuitry includes an invertor 506 which receives the $\overline{CPB}$ signal and applies it thereto to inputs of NAND gates 510 and 512. The SIG signal is applied to an input of gate 510 and also to an input of a NAND gate 514. The output of gate 514 is applied to a NAND gate 516 which is connected to the code generator checker to be subsequently described. The $\overline{PRIMA}$ signal is applied as an input to a NAND gate 518 which also receives the PRB signal as an input. The clear or private mode circuitry further includes NAND gates 520 and 522 connected in a latch configuration to receive the $\overline{RTO}$ and motor signal. The output of the gates comprises the $\overline{CLEAR}$ signal. The signal is applied through a NAND gate 524 to generate the CLEAR signal. The PRIMA signal and the $\overline{PRB}$ signal are applied through a NAND gate 526, NAND gate 528 and invertor 530 to generate the IPVT signal. The output of gate 528 is connected through a NAND gate 532 and an invertor 534 for generation of the STBY signal. Gates 512, 532 and 528 receive inputs from the code generator checker 96 (FIG. 3).

The code generator checker 96 comprises a NOR gate 540 which receives the BVID signal from flipflop 482 and the output from gate 488. The output of gate 540 is connected to the D terminal of a D-flipflop 542 which is interconnected with a D-flipflop 544. The Q output of flipflop 542 is connected to an input of a NAND gate 546, along with the $\overline{Q}$ output of flipflop 544. The Q output of flipflop 544 is connected, along with the $\overline{Q}$ output from flipflop 542, to a NAND gate 548. The outputs of gates 546 and 548 are applied through a NAND gate 550 to two divide-by-16 dividers 552 and 554. A divide-by-two flipflop 556 is also connected in series with divider 554.

The checker checker circuit 100 comprises a flipflop 558 interconnected with flipflop 556 in order to generate the alarm signal. The $\overline{Q}$ terminal of flipflop 558 is applied through a NAND gate 560 to generate the ALMCK signal for application to the P terminal of flipflop 556. The output of gate 512 and the P terminal of flipflop 558 are applied as an input to a NAND gate 564. The $\overline{ALARM}$ signal is also applied to gate 564 in order to generate the ALI signal.

As previously described, the code generator checker 96 and the checker checker 100 operate to continuously monitor the raw transmit data and the coded transmit data. If these two signals are alike or the inverse of one another for 128 contiguous bits, the code generator is assumed to be stuck at one or zero and the alarm signal is initiated. This alarm state blocks the transmit video path and prevents transmission of unscrambled data. The checker checker monitors the code generator checker to insure that during the period two of the clock phase acquisition period, the condition for alarm is present such that the alarm circuit is allowed to go into alarm momentarily. If the code generator checker circuitry as not generated an alarm signal by the time priming is complete, flipflop 558 operates to force the system into an alarm state which can be reset only to turning off the facsimile transmitter. The comparison of the encoded video data and the coded transmit data is accomplished by the gate 540.

Figure 12:
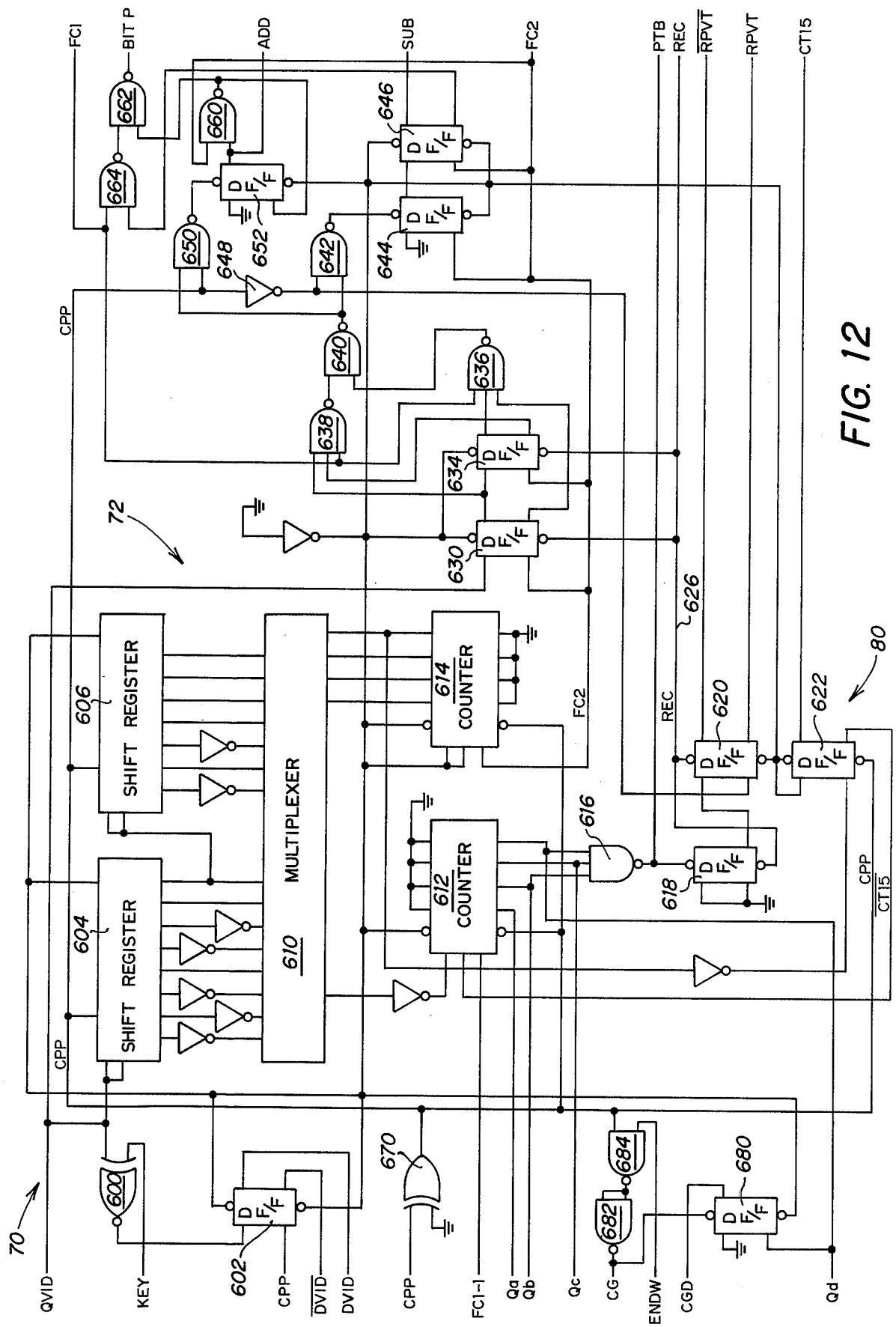
FIG. 12 is a schematic diagram of the receive logic and associated circuitry.

FIG. 12 illustrates the receive data logic 70, the digital correlator 72, the private control 80, receive clock circuitry and the prime data generator previously shown in FIG. 3. Referring to FIG. 12, the randomized keystream K is applied along with the coded video QVID to an exclusive OR gate 600 which decodes by modulo-2 addition the coded video into clear text. The decoded signal is applied to a D-flipflop 602 which generates the DVID and $\overline{DVID}$ signals. Flipflop 602 is clocked by the SAMPLE signal.

The digital correlator 72 comprises 8-bit shift registers 604 and 606 which are clocked by the clock pulse CPP and which receive the QVID signal in order to detect the transmitted correlation pattern previously described. The outputs of shift registers 604 and 606 are applied through a suitable invertor to a 15 input multiplexer 610. The outputs of multiplexer 610 are applied to two 4-bit synchronous counters 612 and 614. This circuitry operates to detect the correlation pattern previously described in the receive mode. The outputs of counter 612 are applied through a NAND gate 616 which is connected to a D-flipflop 618. Flopflop 618 is interconnected with a D-flipflop 620 which generates the RPVT and $\overline{RPVT}$ signal in order to indicate reception of the proper correlation pattern. Flipflop 620 is also connected to a D-flipflop 622 which is connected to generate the $\overline{CT15}$ signal for entry into the counter 612. Flipflop 622 is clocked by the CPP and SD clocks. The flipflops 618, 620 and 622 and associated circuitry thus comprise the private control detection portion of the circuitry. The output of gate 616 comprises the PTB signal while the REC signal is applied to lead 626.

The clock phase circuitry of the system comprises D-flipflops 630 and 634 which generate signals through NAND gates 636 and 638 to a NAND gate 640. The output of gate 640 is applied as an input to a NAND gate 642, the output of which is applied to interconnected D-flipflops 644 and 646. The CPP signal is applied through an invertor 648 to an input of gate 642 and also to an input of a NAND gate 650. The output of gate 650 is applied to the P terminal of a flipflop 652. The Q terminal of flipflop 652 generates the ADD signal, while the Q terminals of flipflop 646 generate the SUB signal. The clock signal FC2 is applied, along with the Q terminal of flipflop 652 to inputs of a NAND gate 660 which applies an input to a gate 662. The fast clock signal FC1 is applied as an input to a NAND gate 664, along with the $\overline{Q}$ output of flipflop 646 to generate the BITP signal.

The clock phase circuitry 66 (FIG. 3) comprises a phase lock loop such that the internal clock of the receiver is corrected to hold the receive clock in phase with the clock generated in the transmitter. The QVID signal is applied to flipflop 630, which, in combination with the remainder of the phase lock loop circuitry, compares the QVID signal against the CPP signal. If the CPP signal is determined to be faster than the detected QVID signal, a subtract SUB signal is generated by the flipflop 646. If the CPP signal is determined by the phase lock loop to be slower than the detected QVID signal, an addition ADD signal is generated from the flipflop 652. The ADD and SUB signals cause the CPP signal to be slowed or increased in speed in order to maintain the internal receive clocks in synchronism with phase with the transmitter clock. The phase lock loop system of the present invention thus provides a automatic phase synchronization system.

The prime data generator of the receive data logic circuitry 70 comprises a D-flipflop 680 which is clocked by the QD signal applied from the counter 612. The CGD signal is applied from the Q terminal of flipflop 680. The P terminal of flipflop 680 is applied to the output of a NAND gate 682, and the input of which is connected to a NAND gate 684. Gate 684 receives the ENDW signal, along with the CPP signal.

Referring to FIG. 13, the out of synchronization detector circuit 112 (FIG. 3) is illustrated. As previously noted, this circuit operates to detect when the received facsimile signal is out of synchronism with the transmitted facsimile system and operates to generate an alarm to indicate that erroneous data is being received. When the system is utilized with a full duplex system, the alarm signal may be generated and transmitted to the transmitter in order to terminate further transmission of the out of sync data and to indicate to the transmit station to begin the transmission over again.

The DVID signal is applied to a flipflop 700 which is interconnected with a flipflop 702 to form a two stage shift register. The outputs of the shift register are applied through an exclusive OR gate 704 to NAND gates 706 and 708. The CPP clock signal is applied to the shift register via an invertor 710 and to inputs of gate 706 and 708. The outputs of gates 706 and 708 are applied to a divider circuit 712 which may comprise for example an SN7493 divider. One-fourth of the divider receives the $\overline{CTD}$ signals and operates as a divide-by-two circuit. The output of the divide-by-two circuit is applied through an invertor 714 to a one shot multivibrator 716. The remaining three-quarters of the divider 712 operates as a divide-by-eight divider which receives the output from gate 708. The output from the divide-by-eight divider is applied through an invertor 718 to a second one shot multivibrator 720.

One shot multivibrators 716 and 720, which may comprise SN74122 circuits, operate as edge detectors and generate signals which are applied to a synchronous up/down counter comprised of counters 726 and 728. Counters 726 and 728 may comprise for example SN74193 counters. Output from the counters is applied through NAND gates 730 and 732 which are connected through a NOR gate 734 and an invertor 736 to the flipflop 724 in order to terminate the reception of count up pulses when the counters are full. The BOR terminals of the counters are applied to a flipflop 740 which operates to generate the out of sync OOS signal. The out of sync OOS signal is also applied through a NAND gate 742 to the inputs of a NAND gate 744. The $\overline{OOS}$ signal is applied through a NAND gate 746 to the inputs of the gate 744 which generates the reset signal which is applied to the load terminals of the counter 726 and 728.

The flipflop 748 is interconnected between the counters 726 and 728 and a pair of series connected divide-by-16 dividers 750 and 752. A 60 Hz signal is applied to divider 750 and the REC signal is applied to the dividers 750 and 752 and through an invertor 754 to the flipflop 748 and to the divider 712.

In operation of the out of synchronism detector shown in FIG. 13, the decoder video signal DVID is applied through the shift register comprised of flipflops 700 and 702 and the associated gates to the dividers 712. Generally, long stretches of white or black picture signals will be transmitted in coded form via the facsimile lines. When the signals are decoded, long stretches of identical digital bits will generally be provided as the DVID signal. However, in case the transmitter and receiver are not in synchronism, the DVID signal will comprise more randomized data. The present system thus monitors the DVID signal and generates an alarm when randomized signals are received.

The shift register comprising flipflops 700 and 702, along with gate 704, detect the polarities of adjacent digital bits. If a pair of digital bits are alike in polarity, a signal is generated from gate 708 to the divider 712. If the polarity of two adjacent pulses are not alike, a count down signal is generated from the gate 706 to the divider 712. The divider 712 operates to reduce the frequency of the count signals in order to reduce the required size of the counters 726 and 728. The divided count up and count down signals are applied from the divider 712 to flipflops 722 and 724 which operate to generate count up or count down pulses at the edge of each detected pulse. The count up and count down pulses are applied to the counters 726 and 728.

The count within counters 726 and 728 is incremented up one count if adjacent pulses are identical in polarity. The counters are decremented four counts, or any other selected number, if pulse pairs are not alike in polarity. Thus, when long stretches of black or white information are received by the receiver, the counters 726 and 728 will be incremented to the maximum value and signals are generated via gates 730 and 732 in order to cut off the application of additional count up pulses when the counters are full. This state indicates that the facsimile transmitter and receiver are in synchronism.

However, when a series of count down pulses are received by the counters 726 and 728, as a result of generally randomized data appearing at the DVID signal, the counters 726 and 728 will rapidly count down to zero. Upon this occurrence, the flipflop 740 detects a zero count in the counters and generates the out of sync OOS signal. This OOS signal generates an alarm and cuts off the receiver and, in the case of a full duplex system, the facsimile machine generates a signal to the transmitter in order to cut off the transmitter and indicate to the transmitter that the transmission should begin again.

The dividers 750 and 752, along with the flipflop 748, operate as a timer to maintain a present receiver in an on state for a predetermined time, such as from 4 to 5 seconds, after generation of the OOS signal. In this manner, generation of the OOS signal does not immediately turn off the entire receiver system.

It will thus be seen that the present invention comprises a facsimile scrambler device which provides high security digital enciphering for operation in conjunction with standard commercial model facsimile machines over typical communications networks. The present system includes accurate digital timing circuitry to acquire and maintain synchronization over long distance domestic and international circuits wherein transmission times and signal variations may be significant.

The clear facsimile signal to be scrambled by the present device is normally quantized into black or white information, enciphered and transmitted via the built-in facsimile machine modem. In applications wherein higher security, resulution and a lower error rate are required, an external modem may be utilized. Operation of the present device is fully automatic, thereby allowing completely unattended reception of both clear and private scramble messages intermixed. Normal facsimile transmission in the private mode requires no special action on the part of the operator. The present system is designed in such a manner that no single failure in the scramble mode can cause inadvertent transmission of clear text. A fail-safe circuit is utilized to continuously monitor the output scramble bit stream for key generator failure while in the transmit scramble mode.

The security of the present system is assured by digitizing the facsimile signal and utilizing bit stream enciphering with a randomized nonlinear key which utilizes a multi-register dynamically connected configuration with multi-step programming to generate each bit of key. The present system has an automatically selected random starting point, with an extremely high number of different settings or codes available to the user and selectively selected by rotary and thumbwheel switches on the console of the system. The present system may, with utilization of specialized interfacing, be utilized with any one of a number of commercial facsimile machines presently commercially available.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A system for scrambling facsimile signals transmitted between a transmitting facsimile station and a receiving facsimile station comprising:
   first scrambling means for being connected between the video amplifier and the transmitter of said transmitting facsimile station,
   means for generating a randomized digital keystream,
   means for selectively varying said randomized digital keystream,
   said first scrambling means including digitizing circuitry for digitizing the output of said video amplifier and further including enciphering means for enciphering said digitized output of said video amplifier according to said randomized digital keystream and for transmitting said enciphered digitized output through said transmitter to said receiving facsimile station,
   second scrambling means for being connected between the demodulator and write amplifier of said receiving facsimile station,
   said second scrambling means including deciphering means for deciphering the enciphered output of said demodulator and for applying the deciphered output to said write amplifier to provide a duplicate of the transmitted facsimile material.

2. The scrambling system of claim 1 and further comprising:
   means for directing said digital enciphered output to an internal modem of said transmitting facsimile station,
   means for being selectively connected to an external modem for directing said digital enciphered output to an external modem if increased resolution is desired.

3. The system of claim 1 and further comprising:
   means in said first scrambling means for generating correlation signals, and
   means in said second scrambling means responsive to said correlation signals for synchronizing with said first scrambling means.

4. The system of claim 3 wherein said correlation signal comprises a predetermined digital coded sequence.

5. The system of claim 3 and further comprising prime generating means in said first scrambling means for generating a random prime sequence subsequent to said correlation signal, and
   means in said second scrambling means for detecting said prime sequence in order to synchronize said scrambling means.

6. The system of claim 5 wherein said prime generating means comprises:
   means for generating a random prime digital sequence, and
   circuitry responsive to said prime digital sequence for selectively inverting said correlation signals.

7. A scrambler system for synchronous digital data transmission comprising:
   means for generating a randomized digital keystream,
   means for selectively varying said randomized digital keystream,
   synchronizing means at a first location for generating a predetermined digital correlation pattern followed by a predetermined digital prime sequence, wherein said prime sequence comprises a series of said correlation patterns with ones of said patterns being selectively inverted in accordance with said randomized digital keystream, means for digitizing data and enciphering data according to said randomized digital keystream and for transmitting said digital enciphered data, correlation detection means at a second location for detecting said digital correlation patterns and digital prime sequence, receiving means responsive to said correlation detection means for receiving and deciphering said digital enciphered data contemporaneously with said enciphering and transmission of said digital data, and means for preventing said receiving means from deciphering said digital enciphered data unless said correlation pattern and said prime sequence meet predetermined accuracy criteria.

8. The scrambler system of claim 7 and further comprising:

means for generating a series of clock phase acquisition pulses prior to generation of said correlation pattern.

9. In a scrambler for a facsimile transmission system having a first facsimile station for enciphering clear facsimile data according to a randomized digital keystream and transmitting enciphered digital data to a second facsimile station for deciphering the enciphered digital data to provide received digital clear facsimile data, an out of synchronization detector comprising:

means for counting up when adjacent bits of the received digital clear facsimile data are alike and for counting down when adjacent bits of the received digital clear facsimile data are not alike, and means for generating an out of synchronization signal when said counting means counts to a predetermined level.

10. The detector of claim 9 wherein said facsimile transmission system includes a duplex channel and further comprising:

means for generating a signal from said second facsimile station through said duplex channel to said first facsimile station for terminating transmission of said enciphered digital data when said counting means counts to said predetermined level.

11. The detector of claim 9 wherein said means for counting counts up four counts and counts down five counts.

12. the detector of claim 9 wherein said means for counting comprises a synchronous up/down counter.

13. A scrambler for use with a digital synchronous data transmission system comprising:

means for generating a randomized digital keystream, means at a first location for enciphering clear data according to a randomized digital keystream and for transmitting enciphered digital data to a second location, said means operating in accordance with a first predetermined internal clock signal, means at said second location for deciphering said scrambled digital data in accordance with a second internal clock signal, phase lock loop circuitry responsive to said enciphered digital data and said second internal clock signal for generating addition and subtraction signals, and means responsive to said addition and subtraction signals for varying said second internal clock signal to maintain said first and second clock signals in synchronism.

14. The scrambler of claim 13 wherein said means for varying adds or subtracts pulses from said second internal clock signal.

15. The scrambler of claim 13 wherein said digital data comprises digital facsimile information.

16. The scrambler of claim 15 wherein said means for varying adds or subtracts pulses from said second internal clock signal.

* * * * *